United States Patent Office 3,422,915
Patented Jan. 21, 1969

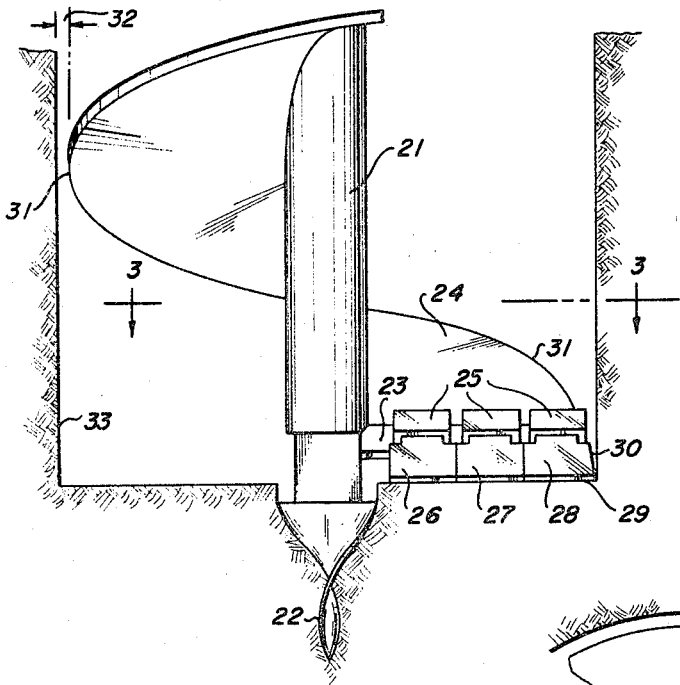
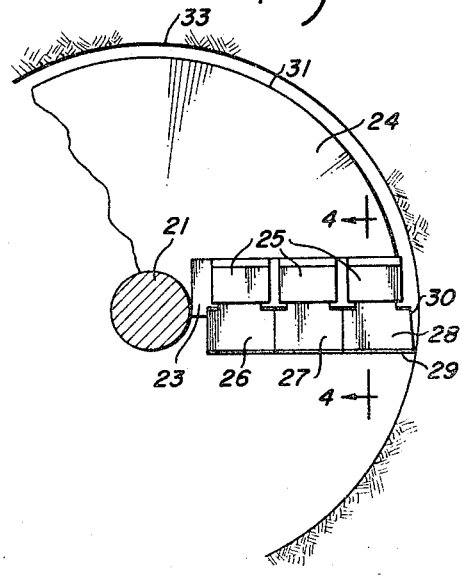
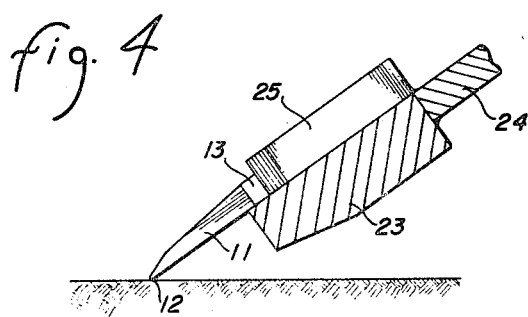
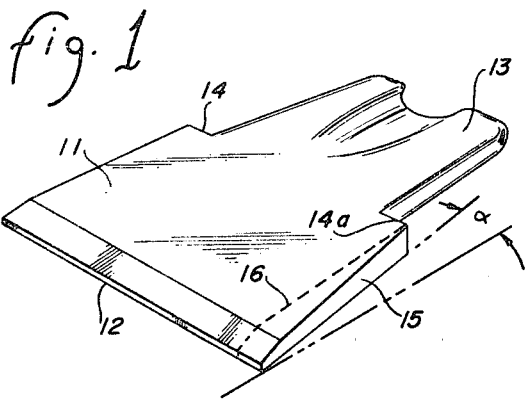

3,422,915
DRILLING AUGER AND CUTTING TOOTH THEREFOR
James P. Watts, 6930 E. Pinchot, Scottsdale, Ariz. 85251
Filed June 30, 1967, Ser. No. 650,379
U.S. Cl. 175—388                              4 Claims
Int. Cl. E21b 9/32; E21c 13/04; E02f 9/28

ABSTRACT OF THE DISCLOSURE

Cutting teeth for drilling augers, mechanical trenchers and other earth-digging or drilling machines in which the cutting teeth form a continuous cutting adge and in which the outboard tooth extends beyond the periphery of the screw flight of the auger or the buckets and digging wheel of a trencher to provide clearance between the wall of a hole and the other components of the machine.

---

This invention relates to cutting teeth for earth-drilling augers and other earth-drilling and digging machines, such as mechanical trenchers, both wheel and ladder-type, and the like.

More particularly, the invention concerns an earth-drilling auger assembly especially adapted for use under severe drilling conditions in which the rate of tooth wear and power requirements are high.

In still another aspect, the invention relates to cutting teeth which are especially shaped and adapted to provide for markedly increased life and to facilitate higher drilling and digging speeds.

Although the invention is explained herein by reference to the use of the novel cutting teeth on a drilling auger, it will be understood that the teeth are also useful in a wide variety of earth-drilling and digging machines such as trenchers, both wheel and ladder-type, and so forth.

Earth-drilling augers comprising a central shaft and a spiral screw flight terminating at the lower end of the shaft in a radially disposed cutter bar having cutting teeth mounted thereon are well known in the art. In prior art devices, the cutting teeth are affixed at spaced points on the cutter bar such as there are substantial distances between the cutting teeth. In certain of the prior art devices, the cutting teeth are disposed at an angle to the cutter bar, and in some devices the angle of the teeth is different. Under normal service conditions, the prior art devices may function effectively. However, under severe service conditions, i.e., in extremely hard-packed soils and where rock formations are encountered, the drilling augers of the prior art are subject to disadvantages which either manifest themselves in high maintenance and repair costs or concomitant low drilling speeds. Additionally, the power necessary to drive the auger is increased by frictional resistance between the periphery of the spiral screw flight and the sides of the hole bing drilled.

In one prior art device, a special reaming bit is installed ahead of the cutter bar to increase the diameter of the hole to slightly larger than the circumference of the screw flight, and it is said that this reduces the wear on the outboard tooth. However, this device is unduly complicated and maintenance costs occasioned by replacement of the reaming bit are practically as large as would be encountered with an auger of conventional design.

Accordingly, it is an object of the present invention to provide a cutting tooth for drilling augers and other drilling and digging machines which overcomes the disadvantages of the prior art teeth.

Another object of the invention is the provision of a cutting tooth and a new earth-drilling auger using such tooth which permits higher drilling speeds or, alternatively, lower power requirements and increased life of the cutting teeth.

Still another object of the present invention is the provision of an improved cutting tooth especially adapted for use under severe drilling and digging conditions and which provides for decreased maintenance cost and increased drilling or digging speeds.

These and other, further, and more specific advantages of the invention will be apparent to those skilled in the art from the following detailed description of the invention taken in conjunction with the drawings, in which:

FIG. 1 is a perspective view of a novel cutting tooth embodying the present invention;

FIG. 2 is a cross-sectional view of a hole, showing an embodiment of a novel auger assembly embodying the invention, in operative position;

FIG. 3 is a sectional view of the auger assembly of FIG. 2 taken along section line 3—3 of FIG. 2; and FIG. 4 is a cross-sectional view of the tooth-cutter bar assembly taken along section line 4—4 of FIG. 3.

Briefly, the objects and advantages of my invention are provided by an earth-drilling auger assembly of the usual type having a vertical central shaft, a pilot auger affixed to the lower end of the shaft, a cutter bar extending radially from the shaft above the pilot auger, and a screw flight having its lower end attached to the cutter bar and extending coaxially upwardly and affixed to the shaft. A plurality of cutter elements are affixed to the cutter bar by means of inverted channel members which, with the bar, form pockets in which the shanks of the cutting teeth are frictionally engaged. The cutter elements carried by the cutter bar each comprise a shank portion adapted to be received and held within one of the pockets and a blade portion formed integrally with the shank. The blade portion is wider than the shank portion and has a sharpened front edge. The cutter elements are dimensioned such that when the shanks are received in the pockets, the side edges of the blades meet and the sharpened front edges form a continuous cutting edge extending radially from the shaft.

In a preferred embodiment, the edge of the cutter element furthest from the central shaft extends a distance beyond the periphery of the screw flight sufficient to increase the diameter of the hole being drilled to the point that rotational clearance exists between the sides of the hole and the periphery of the screw flight, thereby reducing power requirements necessary for rotation of the auger assembly.

The cutter elements employed in the assembly described above are themselves of a novel shape and construction and comprise a blade portion which is substantially flat, a shank portion formed integrally with the rear edge of the blade and narrower than the blade, which shank portion extends rearwardly from the blade. The front edge of the blade is sharpened to provide a cutting edge.

Turning now to the drawings, FIG. 1 is a perspective view of a cutting tooth embodying the present invention, specifically the tooth which is to be located on the outermost portion of the cutter bar. The tooth comprises a blade portion 11 having a sharpened leading edge 12 and a rearwardly extending shank portion 13 which is narrower than the blade portion. The juncture of the blade portion and the shank portion forms shoulders 14 and 14a. In a preferred embodiment, the outboard edge 15 of the tooth is cut away on a line forming the angle $\alpha$ with the longitudinal axis of the tooth. In the case of the inboard teeth, the edges of the blade portion 11 are parallel to the longitudinal axis of the tooth as indicated by the dashed line 16.

FIG. 2 illustrates the earth-drilling auger assembly including teeth which embodying the present invention, inserted in a hole in drilling position. The assembly comprises a central shaft 21 having a pilot auger 22 on the lower end thereof. A cutter bar 23 extends radially outwardly from the shaft 21 above the pilot auger 22. A spiral screw flight 24 is affixed at its lower end to the cutter bar 23 and extends coaxially upwardly and is affixed to the shaft 21. The cutter bar 23 carries a plurality of inverted channel members 25 which, with the cutter bar 23, form cutting teeth shank-receiving pockets. The cutting teeth 26, 27 and 28 are shaped and dimensioned to provide a continuous cutting edge 29 when the shanks of the teeth are inserted into and frictionally engaged by the pockets 25. The outboard edge 30 of the outermost tooth extends beyond the periphery 31 of the spiral screw flight 24 to provide rotational clearance 32 between the periphery 31 of the screw flight 24 and the sides 33 of the hole being drilled by the auger.

The assembly of FIG. 2 is shown in cross section in FIG. 3 with like reference numerals indicating corresponding elements.

The cutter bar-cutter tooth assembly of FIGS. 2–3 is illustrated in cross section in FIG. 4. The cutter bar 23 is affixed to the bottom end of the spiral screw flight 24 by welding or other suitable means of attachment. Inverted channel members 25 are welded or suitably affixed by other means to the cutter bar forming the shank-receiving pockets. The shank portion 13 of the cutting tooth is received in and frictionally engaged by the pocket 25, holding the tooth in operative position for drilling. The blade portion 11 of the tooth extends forwardly of the cutter bar 23 and is provided with a sharpened leading edge 12 which forms the cutting edge of the tooth.

In comparison to a prior art device similar to the assembly of FIG. 2, except that the teeth are spaced upon the cutter bar and except that the leading edges of the two outermost teeth are fixed at an angle to the cutter blade, the assembly of the present invention provides an approximate 30% increase in the drilling speed with significantly reduced maintenance costs.

Various changes in the devices chosen for purposes of illustration in the drawings will readily occur to persons skilled in the art having regard for the disclosure hereof. To the extent that such modifications and variations do not depart from the spirit of the invention, they are intended to be included within the scope thereof which is not limited to the devices specifically illustrated in the drawings but, rather, only by a just interpretation of the following claims.

Having fully described the invention in such manner as to enable those skilled in the art to understand and practice the same, the invention claimed is:

1. An earth-drilling auger assembly comprising:
   (a) a vertical central shaft having an upper and lower end;
   (b) a pilot auger affixed to the lower end of said shaft;
   (c) a cutter bar having a leading edge and a trailing edge, extending horizontally radially from said shaft above said pilot auger, said cutter bar being inclined upwardly from the leading edge to the trailing edge thereof;
   (d) a spiral screw flight having its lower end attached to said cutter bar and extending coaxially upwardly and affixed to said shaft;
   (e) a plurality of inverted channel members affixed to said cutter bar forming cutter element shank-receiving pockets with said cutter bar, the longitudinal axis of said pockets being disposed substantially perpendicular to the leading edge of said cutter bar;
   (f) a plurality of cutter elements carried by said cutter bar and forming a cutting edge substantially parallel to the leading edge of said cutter bar, each said cutter element comprising
      a shank portion shaped to be received and frictionally engaged in one of said pockets, and
      a blade portion formed integrally with said shank portion, said blade portion being wider than said shank portion and having a sharpened front edge and side edges,
   said cutter elements being dimensioned such that when said shanks are received in said pockets, the side edges of adjacent cutter elements meet and the sharpened front edges form a continuous cutting edge extending radially from said shaft.

2. The auger assembly of claim 1 in which the cutter element located radially furthest from said shaft has a shoulder formed integrally with the blade portion thereof which extends outwardly past the periphery of said screw flight a distance sufficient to provide rotational clearance for said screw flight between the periphery thereof and the wall of a hole being drilled by said auger.

3. A cutter element for an earth-drilling auger assembly having a plurality of cutter elements disposed on a cutter bar extending radially from the central shaft and a spiral screw flight extending coaxially upwardly and affixed to said shaft, said cutter element comprising:
   (a) a generally flat blade portion having a sharpened front edge, a rear edge and side edges;
   (b) a shank portion formed integrally with and narrower than said blade portion, said shank portion extending rearwardly from the rear edge of said blade portion, forming shoulders at the juncture of said shank portion and said blade portion;
the length of said shoulders being dimensioned such that when said element is received and frictionally engaged in the outermost pocket carried by said cutter bar, the outboard edge of said cutter element extends outwardly past the pheriphery of said screw flight a distance sufficient to provide rotational clearance for said screw flight between the periphery thereof and the wall of a hole being drilled by said auger.

4. A cutter blade for earth-drilling and digging machines comprising:
   (a) a trapezoidal generally flat blade portion having a sharpened front edge,
      a rear edge parallel to and shorter than said front edge,
      a pair of side edges, one side edge being perpendicular to said front and rear edges and the other side edge forming an acute angle with said front edge;
   (b) a shank portion formed integrally with and narrower than said blade portion, said shank portion extending rearwardly from the rear edge of said blade portion, forming shoulders at the juncture of said shank portion and said blade portion.

References Cited
UNITED STATES PATENTS

| | | | |
|---|---|---|---|
| 1,647,670 | 11/1927 | Sipe | 175—413 X |
| 1,997,887 | 4/1935 | Prior | 175—394 X |
| 3,318,401 | 5/1967 | Carbert | 175—413 |

ERNEST R. PURSER, *Primary Examiner.*

U.S. Cl. X.R.

37—142; 175—394